United States Patent
Neitemeier et al.

(10) Patent No.: US 10,091,932 B2
(45) Date of Patent: Oct. 9, 2018

(54) CROP FLOW MONITORING OF A CROP GATHERING DEVICE

(71) Applicant: CLAAS Selbstfahrende Erntemaschinen GmbH, Harsewinkel (DE)

(72) Inventors: Dennis Neitemeier, Lippetal (DE); Thilo Krause, Glinde (DE); Andreas Nienhaus, Münster (DE); Andreas Skiba, Bielefeld (DE); Boris Kettelhoit, Gütersloh (DE)

(73) Assignee: CLAAS Selbstfahrende Erntemaschinen GmbH, Harsewinkel (DE)

( * ) Notice: Subject to any disclaimer, the term of this patent is extended or adjusted under 35 U.S.C. 154(b) by 0 days.

(21) Appl. No.: 15/633,220

(22) Filed: Jun. 26, 2017

(65) Prior Publication Data
US 2018/0084719 A1    Mar. 29, 2018

(30) Foreign Application Priority Data
Sep. 27, 2016  (DE) ......................... 10 2016 118 244

(51) Int. Cl.
*A01D 41/127*  (2006.01)
*G01F 1/05*  (2006.01)
(Continued)

(52) U.S. Cl.
CPC .......... *A01D 41/1271* (2013.01); *G01F 1/05* (2013.01); *G01F 1/06* (2013.01); *G01F 11/24* (2013.01);
(Continued)

(58) Field of Classification Search
CPC .. A01D 41/00; A01D 41/127; A01D 41/1271; A01D 41/1272; A01D 41/1273;
(Continued)

(56) References Cited

U.S. PATENT DOCUMENTS 8,635,840 B2 * 1/2014 Behnke .............. A01D 41/1277
460/1
9,445,546 B2 * 9/2016 May ..................... A01D 75/282
(Continued)

FOREIGN PATENT DOCUMENTS

DE   10 2008 032 191 A1   1/2010
EP     3 150 047 A1   4/2017

OTHER PUBLICATIONS

European Office Action for EP Patent Application No. 17171193.0 dated Oct. 20, 2017, 12 pages.
(Continued)

*Primary Examiner* — Robert E Pezzuto
(74) *Attorney, Agent, or Firm* — Lempia Summerfield Katz LLC (57) ABSTRACT

An agricultural work machine, such as a self-propelled harvester, is provided. The agricultural work machine includes a crop gathering machine which has a crop cutting device, a crop collecting device and/or a crop feeding device, and at least one crop conveyor, and comprising an image processing system, a data output unit, and at least one sensor system assigned to the crop gathering machine for recording a crop flow in the crop gathering machine. The sensor system is coupled to the image processing system for transferring images. The image processing system processes a selection of available images, such as by pre-processing the images to be transferred in a first step, in a further step determining an optical flow and corresponding vector fields from the pre-processed images, and in a subsequent step deriving and assessing speed trends of the crop flow from the corresponding vector fields.

22 Claims, 6 Drawing Sheets (51) Int. Cl.
*G01F 1/06* (2006.01)
*G01F 11/24* (2006.01)
*A01D 41/00* (2006.01)
*G01F 11/00* (2006.01)
*G06F 19/00* (2018.01)

(52) U.S. Cl.
CPC .............. *A01D 41/00* (2013.01); *G01F 11/00* (2013.01); *G06F 19/00* (2013.01)

(58) Field of Classification Search
CPC .. A01D 41/1277; A01D 43/085; G01F 1/662; G01F 1/666; G01F 1/05; G01F 1/06; G01F 11/24; G01N 21/274; G01N 21/85; G01N 21/55; G01N 21/3563; G01N 21/27; G01N 21/276; G06T 7/246; G06K 9/46
USPC .......... 56/10.2 A–10.2 E, 10.2 R; 460/1, 4–7; 701/28, 31, 47, 48, 50
See application file for complete search history.

(56) References Cited

U.S. PATENT DOCUMENTS 9,629,308 B2 * 4/2017 Scholer .............. A01D 41/1272
9,631,964 B2 * 4/2017 Gelinske ................. G01F 1/662
2017/0091954 A1 3/2017 Roth et al.

OTHER PUBLICATIONS

Sukeshini N. Tamgade et al.; "Motion vector estimation of video image by Pyramidal implementation of Lucas Kanade Optical flow"; Second International Conference on Emerging Trends in Engineering and Technology, ICETET-09; 2009; pp. 914-917.
Wilfried Enkelmann; "Obstacle detection by evaluation of optical flow fields from image sequences"; Butterworth-Heinemann Ltd.; vol. 9, No. 3, Jun. 1991; pp. 160-168.
James Schnaider; "Modeling of the Power Requirement and Crop Flow for a Disc Mower"; University of Saskatchewan; Saskatoon, Saskatchewan; Dec. 2009; 124 pages.

* cited by examiner

CROP FLOW MONITORING OF A CROP GATHERING DEVICE

CROSS REFERENCE TO RELATED APPLICATION

This application claims priority to German Patent Application No. DE 102016118244.3, filed Sep. 27, 2016, the entire disclosure of which is hereby incorporated herein by reference.

TECHNICAL FIELD

This application relates generally to an agricultural work machine, and specifically to a crop gathering device.

BACKGROUND

Self-propelled harvesters may be designed as combine harvesters with crop gathering machines adapted to the respective crop. In spite of a plurality of automatic settings of crop gathering machines, such as for example, cutting height, reel position and cutter bar position, the driver of the combine harvester must continuously visually monitor the crop flow within the crop gathering machine. For example, the driver must make certain that a uniform crop flow speed is present within the crop gathering machine, since in the case of a non-uniform crop flow, the vehicle speed and thus crop collection must be reduced in order to prevent crop jams. If a crop jam occurs (e.g., a blocking of the crop flow), the harvesting operation must be terminated and a time-consuming elimination of the crop jam must be performed. The time required for this significantly impairs the efficiency of the harvesting. One problem in avoiding a crop jam is that by the time a completely developed crop jam can be clearly recognized, it is frequently too late to correct the operation of the crop gathering machine.

Published application DE 10 2008 032 191 A1 describes a self-propelled harvester with a sensor unit for monitoring the crop flow within a crop gathering machine of the harvester. A camera is provided which creates images of the crop flow. These images are then subjected to a motion blur method or an image comparison method. In the case of the motion blur method, by setting the exposure times of the cameras, irregularities in the crop flow are recorded by means of the image sharpness.

BRIEF DESCRIPTION OF THE DRAWINGS

The accompanying drawings, which are incorporated in and constitute a part of this specification, illustrate various aspects of the invention and together with the description, serve to explain its principles. Wherever convenient, the same reference numbers will be used throughout the drawings to refer to the same or like elements.

DETAILED DESCRIPTION OF EMBODIMENTS

As discussed above, harvesters, such as disclosed in DE 10 2008 032 191 A1, use the motion blur method, which by setting the exposure times of the cameras, records irregularities in the crop flow by means of the image sharpness. However, such an approach results in a machine evaluation of this image data for automatic control and regulation of the harvester being difficult. In addition, the precise recording of irregularities in the crop flow is, to a great extent, dependent on the default setting of the exposure time. In various methods, such as the image comparison method discussed below, shifts of crop features are recorded from image to image and inferences about crop flow problems are made. However, this requires a time-consuming detection of crop characteristics from the image and if necessary, prior training in the method. Previous approaches, such as disclosed in DE 10 2008 032 191 A1, do not even indicate which crop characteristics are supposed to be recorded.

Thus, monitoring of the crop flow as disclosed in more detail below results in one or more of: precision; reliability; and punctuality. The agricultural work machine, such as a self-propelled harvester, may include a crop gathering machine which has a crop cutting device, a crop collecting device and/or a crop feeding device, and at least one crop conveyor. The agricultural work machine may further include an image processing system, a data output unit, and at least one sensor system assigned to a part of the agricultural work machine (such as assigned to the crop gathering machine) for recording a crop flow in the crop gathering machine. The sensor system may be coupled to the image processing system for transferring the images. The image processing system may perform any one, any combination, or all of the following: receive the images generated from the sensor system; process a selection of available images; pre-process the images to be transferred in a first step, in a further step determine an optical flow and corresponding vector fields from the pre-processed images, and in a subsequent step derive and assess speed trends of the crop flow from the corresponding vector fields. In this way, it is more likely that changes occurring in the crop flow are detected early. In particular, incipient crop jams can be detected early in the crop gathering machine. The knowledge that as a rule, a crop jam is preceded by a reduction of the crop flow speed in the crop gathering machine is relevant. In this regard, the determination of the optical flow allows for a detailed, continuous and comprehensive determination of local high-resolution speeds in the crop gathering machine. In this way, a CPU-intensive identification of structures, objects or crop characteristics need not be necessary. The pre-processing of the images may further increase the reliability and speed of the image processing. In addition, determining the crop flow speed trends simplifies control of the crop gathering machine and/or monitoring of the crop flow for the vehicle driver.

In one implementation, the at least one sensor system comprises a camera. More specifically, the camera may be configured or comprise a monochrome and/or color camera. As a result, the images (e.g., a sequence of images) may be generated easily and with a high image resolution.

So that, the image processing system may access reference speeds for comparison. In one implementation, other images, such as images from the crop gathering machine that record the adjacent surrounding area, are available for analysis. Various adjacent surrounding areas are contemplated including any one or both of the following: a field region in direction of travel in front of the crop gathering machine and/or a field region in direction of travel behind the crop gathering machine.

In one implementation, the image processing system may be implemented in technically simple and cost-effective manner. In particular, the image processing system may comprise an electronic computing unit, which may be assigned to the agricultural work machine, and which may electronically process and evaluate the images and/or image data that are derived from the images.

Alternatively or in addition, various aspects of the images may be analyzed, such as determining the optical flow and the corresponding vector fields. As one example, the image processing system may analyze two images, such as two consecutive images of an image sequence grouped into an image pair. The image processing system may identify the image pair by identifying that the two images have a time between the two images of the respective image pair recorded and/or specified, and by each image having an intensity pattern.

In this way, the images may be rapidly and reliably processed by the image processing system. In the first step, the image processing system may perform the pre-processing of the images by performing one, some or all of the following: intensity standardization; noise reduction; shadow suppression; image stabilization and/or image rotation. The intensity standardization may increase the dynamic range and may improve the contrast of the images. The noise reduction may filter out the dust that occurs during harvesting from the images and hence may reduce a distortion of the imaged crop flow. The shadow suppression may blank out large areas with essentially uniform intensities, such as for example shadows, from the subsequent image processing, wherein textures of the images are essentially retained.

By means of image stabilization, vibrations and oscillations of the driver's cab and/or of the agricultural work machine may be compensated. In this way, the image section may be stabilized. Further, by means of optional image rotation and/or with the help of prominent edges, the image may be realigned to the direction of travel, so that the image region may be easier to edit.

In a further implementation, an additional step of determining the optical flow may be performed in which the image processing system determines position shifts of the intensity patterns between the images of at least one image pair. The position shifts may comprise shift values and shift directions. In addition, the image processing system may respectively combine shift values and/or shift directions of the intensity patterns for each image pair as vectors in the corresponding vector field (e.g., in a matrix, of the respective image pair). As a result, the image processing system may be simplified and accelerated. By using intensity patterns, a time-consuming recording or identification of image features/objects may be unnecessary. The positions of the individual intensities in the intensity patterns may furnish the reference points for the calculation of the speeds. Also, by recording the shift values and/or the shift directions and combining them in vector fields, the flow speed, such as over a wide area and with high resolution, may be calculated for the entire crop flow of the crop gathering machine.

Thus, the optical flow and the corresponding vector fields can be easily and precisely calculated. In one implementation, an additional step may be performed in which the optical flow and the corresponding vector fields are calculated by means of a differential method. The differential method, which may comprise a gradient function, is generated by deriving the intensity patterns of each image, subtracting the gradient functions of both images of the respective image pair, with a resulting function reproducing the shifts of the intensity patterns for the corresponding vector field of the image pair.

In a specific implementation, the differential method may comprise a Lucas-Kanade method, in which it is assumed that a consistency of the optical flow in a local surrounding area of a pixel of an image for which the optical flow is being determined. Other computer vision methods for optical flow estimation are contemplated. In one implementation, the robustness of the image analysis, such as due to noise and small defects in the images, may be improved. In addition, with the differential method (such as using the Lucas-Kanade method), rotation, dimensional scaling and torsions of partial images may be considered.

In a more specific implementation, the Lucas-Kanade method may comprise a pyramidal Lucas-Kanade method. For example, a first image resolution of the images of each image pair is reduced to at least one further image resolution for calculation of the optical flow and the corresponding vector fields, and subsequently the optical flow and the corresponding vector fields are calculated and iteratively corrected in an incremental restoration of the first image resolution. In one implementation, the required image rate/frame rate of an image sequence, in particular of a video, may be lowered.

So that, the speeds in each image pair may be easily determined. In one implementation, speeds derived from the images, such as crop flow speeds in the crop gathering machine, may be calculated from the shift values of the corresponding vector field of the respective image pair and the time between the images of the respective image pairs, and may be represented as crop flow speed trends, such as the crop flow speed trends of the crop flow.

In one implementation, image regions that represent the crop flow may be divided, such as into regions, and analysis performed for the image regions, such as an averaged crop flow speed may be determined for each region. In particular, averaged crop flow speed may be determined by averaging, such as by forming the median from the crop flow speeds of the respective region, with discrete crop flow speed trends being derived and assessed from the averaged crop flow speeds of each region. As a result, the information may be clearly summarized and the quantity of information may be reduced. In addition, a discrete crop flow speed trend may assist in localizing the problem, such as by simplifying the localization of the problem areas and making it easier to initiate position-specific countermeasures.

In one implementation, the image processing system may identify at least one aspect of the crop flow speeds and/or the averaged crop flow speeds (such as a decrease in crop flow speeds and/or the averaged crop flow speeds in certain areas or regions). The image processing system may interpret the results (such as the decrease in the crop flow speeds and/or the averaged crop flow speeds) as the formation of a crop jam. In response to this interpretation of the results, the resulting crop jam may be resolved by regulatory measures.

As a result, the vehicle driver may be relieved, since the driver need no longer visually monitor the crop flow in the crop gathering machine.

To further relieve the vehicle driver and prevent crop jams in a timely and efficient manner, in one implementation, the crop collecting device comprises a reel, and the regulatory measures in the event of the formation of a crop jam comprise a reduction of a vehicle speed, and/or a reduction of a crop conveying speed of the crop conveyor, and/or a shifting of the reel. In this regard, parts of it, such as the tines of the reel, engage in regions of the crop flow with an identified formation of a crop jam.

In accordance with a further implementation, the image processing system may identify a stoppage of the crop flow in one or more certain areas, and may interpret the stoppage as a crop jam. The crop jam may be resolved by further regulatory measures, wherein the further regulatory measures comprise a stopping or resetting of the agricultural work machine, and/or a lifting of the crop gathering machine. Among other things, this has the effect that no further crop enters the crop gathering machine and congested crop can be conveyed more easily to the inclined conveyor by lifting of the crop gathering machine, which results in inclination of the crop gathering device. Manual removal of the crop jam by the vehicle driver may then be unnecessary.

Figure 1:
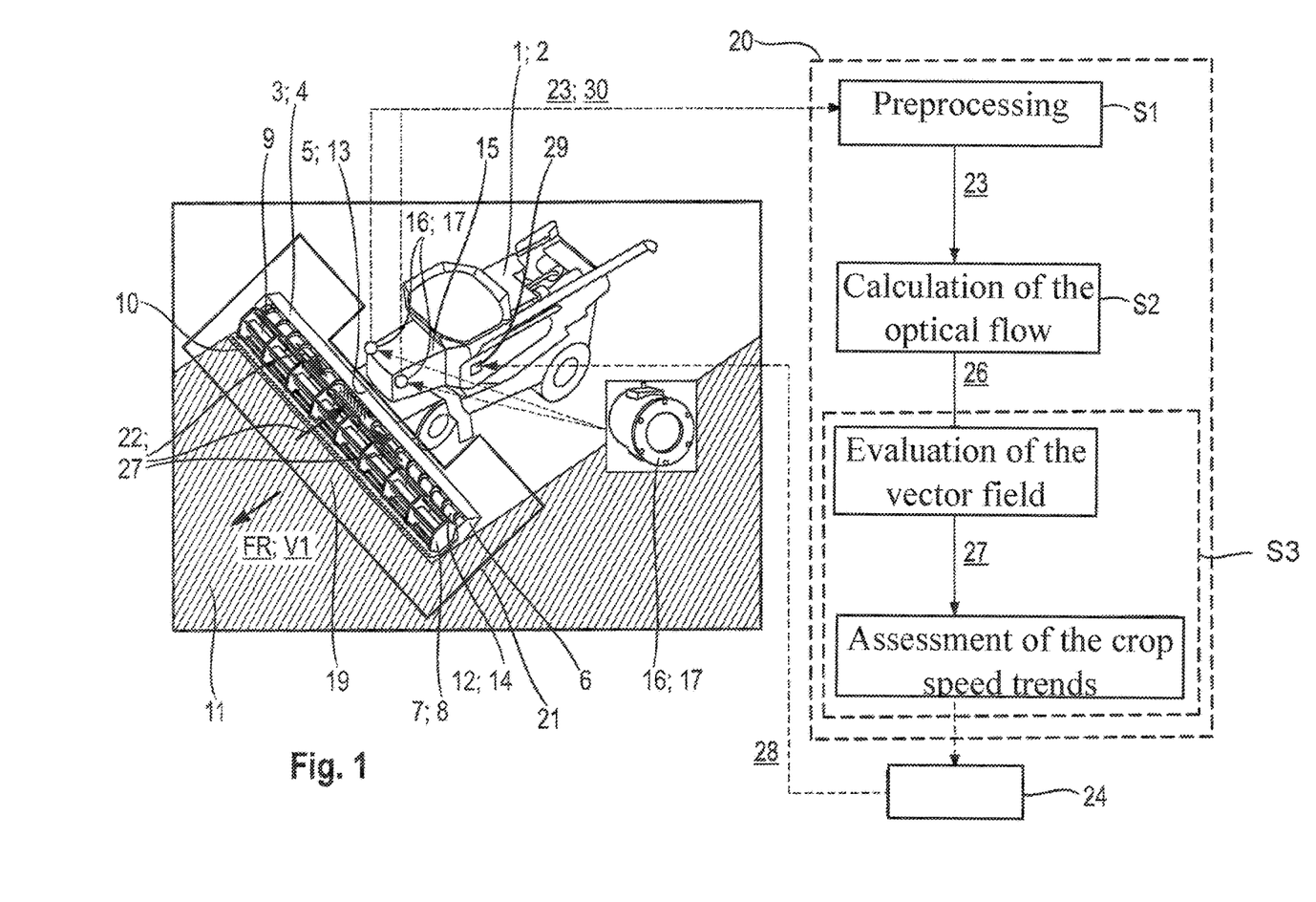
FIG. 1 illustrates a schematic perspective view of an agricultural work machine with an image processing system, and an associated flow chart.

FIG. 1 shows in a schematic perspective view of agricultural work machine 1 configured as a combine harvester 2 with a crop gathering machine 3 configured as a cutting unit attachment 4 for grain. As an alternative, the crop gathering machine 3 can, for example, be configured as a draper, mower, or as a maize harvester. The agricultural work machine 1 moves in the direction of travel FR with a vehicle speed V1. The crop gathering machine 3 is arranged in a front region of the combine harvester 2 and is connected via a crop feeding device 13 configured as an inclined conveyor 5 to the combine harvester 2. The crop gathering machine 3 has a cutting unit housing 6 and a crop cutting device 10 configured as a cutter bar with oscillating blades. In addition, the crop gathering machine 3 comprises a crop collecting device 8. The crop collecting device 8 in the cited example comprises an adjustably mounted, rotating reel 7. The reel 7 has reel tines for collecting the crop. The reel 7 supports the collection of the crop 9 in the crop gathering machine 3. In addition, the crop collecting device 8 has a cutting table. Furthermore, the crop gathering machine 3 comprises a crop conveyor device 14 arranged within the cutting unit housings 6 and essentially perpendicular to a direction of travel FR and arranged downstream from the crop cutting device 10, configured as a transverse conveyor 12. The transverse conveyor 12 conveys the harvested crop 9 to the middle of the crop gathering machine 3, where it then transfers the crop 9 to the crop feeding device 13 configured as an inclined conveyor 5. The inclined conveyor 5 then conveys the crop 9 to a thresher mechanism (not shown in the figure) of the combine harvester 2.

The crop conveyor device 14, the crop cutting device 10 and/or the crop feeding device 13 may be configured in different ways depending on the type of crop gathering machine 3. For example, in the case of a draper, the crop conveyor device 14 is configured as a conveyor belt with optional lead screws, and the crop feeding device 13 may, in addition, have a draw-in roller at the inlet of the inclined conveyor.

In one implementation, a sensor system 17 is arranged on the front edge above a driver's cab 15 of the combine harvester 2. The sensor system 17 comprises at least one optical sensor, which may comprise a camera 16. The sensor system 17 is configured and arranged such that its detection range 21 covers at least one crop flow 22 in the crop gathering machine 3. The sensor system 17 generates images 23 at least of the crop flow 22 in the crop gathering device 3. In the process, either one or several parts of the crop flow 22, or the entire crop flow 22 can be recorded. Moreover, the sensor system 17 may be coupled to an image processing system 20. In particular, the sensor system 17 may transfer the generated images 23 to the image processing system 20.

The image processing system 20 may be used to analyze or process the generated images 23. In one implementation, the image processing system 20 may: preprocess the transferring images 23 in a first step S1; in a further step S2 determine from the preprocessed images 23 an optical flow 25 and corresponding vector fields 26; and in a subsequent step S3 derive and assess crop flow speed trends 28 of the crop flow 22 from the corresponding vector fields 26.

Further, the image processing system 20 may be configured to derive crop flow speeds 27 from the corresponding vector field 26. By comparing at least two images 23, such as consecutive images 23 of an image sequence 30, of the sensor system 17, the image processing system 20 may calculate the crop flow speeds 27 by means of calculation of the optical flow 25 and of the corresponding vector fields 26. The images 23 may be frames of a video of a camera 16. Alternatively, the images 23 may be still images of the camera 16. The optical flow 25 of an image sequence 30 is the vector field 26 of the projected speed 56 of visible points on an image plane. The crop flow speeds 27 may be locally resolved and thus part of a plurality of crop flow speeds 27 in a crop flow 22. The image processing system 20 may be configured to assess the crop flow speeds 27. The assessment of the crop flow speeds 27 can occur as an alternative to or in addition to the assessment of the crop flow speed trends 28. The image processing system 20 may derive the crop flow speed trends 28 from the crop flow speeds 27. For example, in a crop flow speed trend 28, at least two crop flow speeds 27 may be compared in terms of time and/or place. In the process, the crop flow speed trends 28 can be local crop flow speed trends 28 and/or time crop flow speed trends 28. In one implementation, the image processing system may continuously assess and/or update local crop flow speed trends 28.

The derived and assessed crop flow speed trends 28 may subsequently be transferred to a data output unit 24 coupled to the image processing system 20. The data output unit 24 may be configured as an interface. In a specific implementation, the data output unit 24 may, in addition, be connected via a CAN bus, ISO bus, or another data transfer system, such as for example Bluetooth or WLAN to one or more systems of the agricultural work machine 1. The data output unit 24 may be connected to a logic and control unit 29 and/or to the display unit. The data output unit 24 may be configured to provide the crop flow speeds 27 and/or the derived and assessed crop flow speed trends 28 to the logic and control unit 29 of the agricultural work machine 1.

As discussed above, the sensor system 17 may comprise at least one camera 16. The image sequence 30 may comprise a video. Alternatively, the image sequence may comprise still images. In the present example, two cameras 16 are arranged on the agricultural work machine 1 as sensor system 17. A sufficient number of cameras 16 may be arranged on the agricultural work machine 1 to completely record at least the crop flow 22 of the crop gathering machine 3. Hence, the number of cameras 16 may depend essentially on the lens used and a width of the crop gathering machine 3. As an alternative, it is contemplated to record less than the entire region, such as only one region of the crop flow 22 where a crop jam is most probable, for example a region of the crop flow 22 between the crop conveyor device 14 and the crop feeding device 13.

The cameras 16 may be configured as monochrome cameras 16 and/or as color cameras 16. Alternatively or in addition, the use of infrared cameras 16 is contemplated. The cameras 16 may have a high refresh rate/frame rate. For example, the cameras 16 may have a frame rate higher than 20 frames per second. Likewise, the agricultural work machine may further include a light source (not shown) in order to light at least a part of the crop gathering device 3. In the instance that an infrared camera 16 is used, the lighting generated may be in the infrared range or in a wavelength range provided for recording. In one implementation, the lighting may be automatically adapted to an ambient light intensity (e.g., an ambient light reading is taken and the lighting is adjusted accordingly).

The images may also record the adjacent surrounding area 19 of the crop gathering machine 3. In the process, the adjacent surrounding area 19 may comprise a field region in direction of travel FR in front of the crop gathering machine 3 and/or a field region in direction of travel FR behind the crop gathering machine 3. By recording the surrounding area 19, the image processing system 20 may determine a vehicle speed V1. The optically determined vehicle speed V1 may then be compared with values of an inherently known vehicle speed measurement system of the agricultural work machine 1 and serve as a reference value for the image processing system 20. The recorded surrounding area 19 may extend up to a first amount (e.g., three meters) in front of and up to a second amount (e.g., two meters) behind the crop gathering device 3.

The image processing system 20 may comprise an electronic computing unit which electronically processes and evaluates the images 23 and/or image data that are derived from the images 23. To this end the, computing unit may have a memory with stored algorithms for image processing. The image data comprise, for example, the corresponding vector fields 26, the crop flow speeds 27 and/or image data calculated from these image data. The computing unit may be assigned to the agricultural work machine 1.

Figure 2:
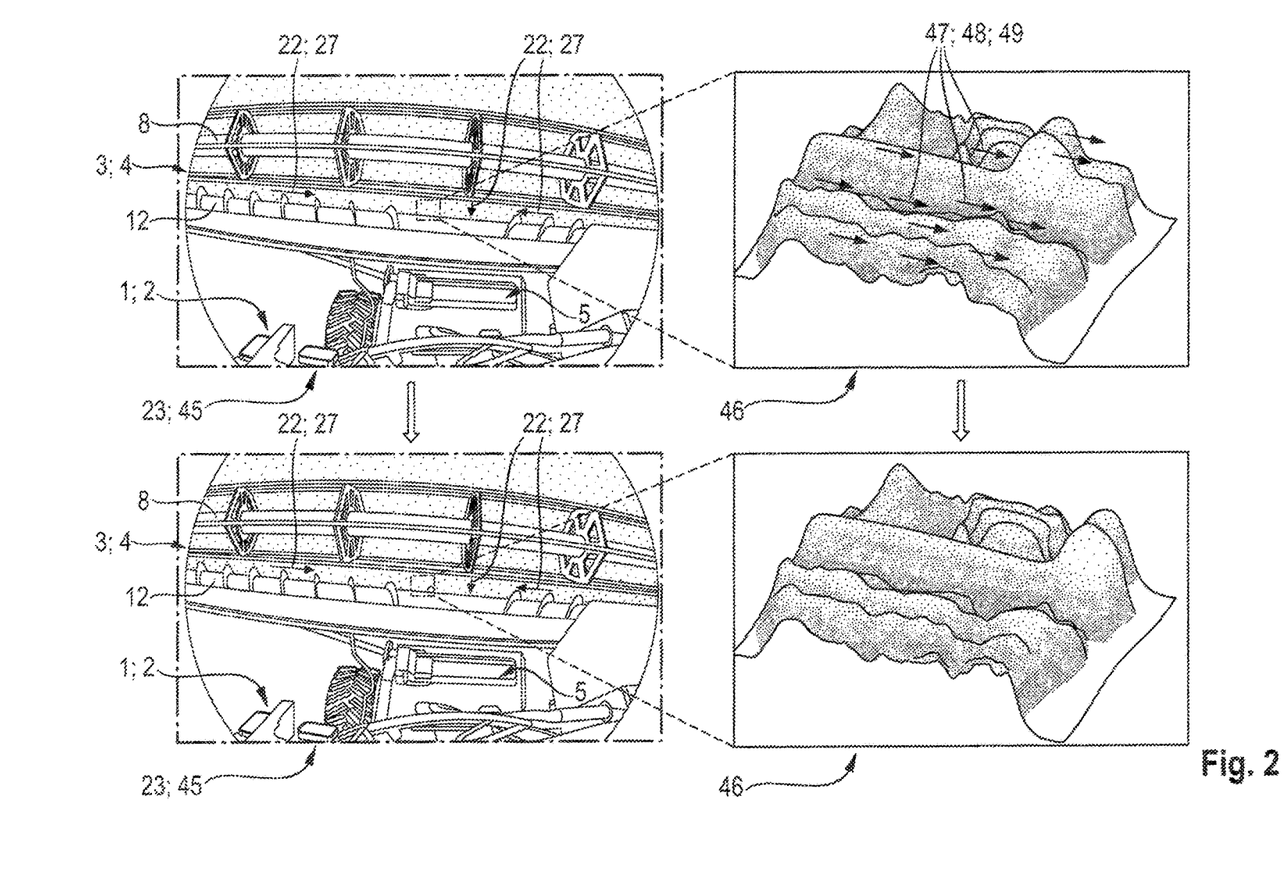
FIG. 2 illustrates schematic representations of a pair of images and of corresponding intensity patterns.

FIG. 2 shows a schematic representation of two consecutive images 43, 44 of an image sequence 30, which can be used for the calculation of the optical flow 25. In each case, two images 43, 44 of the image sequence 30 may be grouped by the image processing system 20 into an image pair 45. In the following, the images 43, 44 of an image pair may be referred to as a first and a second image 43, 44. In one implementation, the images 43, 44 of an image pair 45 follow one another directly, in order to be able to have the lowest possible interval to one another. In addition, a time between the images 23 is recorded and/or is specified. In particular, each image 23 has at least one intensity pattern 46. The intensity pattern 46 may comprise an intensity level profile of a partial image and/or of the entire image 23. The intensity pattern 46 may depict an intensity level with the associated spatial coordinate in the image 23, such as for each pixel, and/or such as for pixels surrounding it, of the image 23. The intensity pattern 46 may have at least the dimensions of a pixel with at least one pixel surrounding it. Depending on the dimensions of the intensity pattern 46, each image 23 may have one or more intensity patterns 46. The optical flow 25 may thus be calculated for the intensity patterns 46 of each image pair 45.

Figure 3:
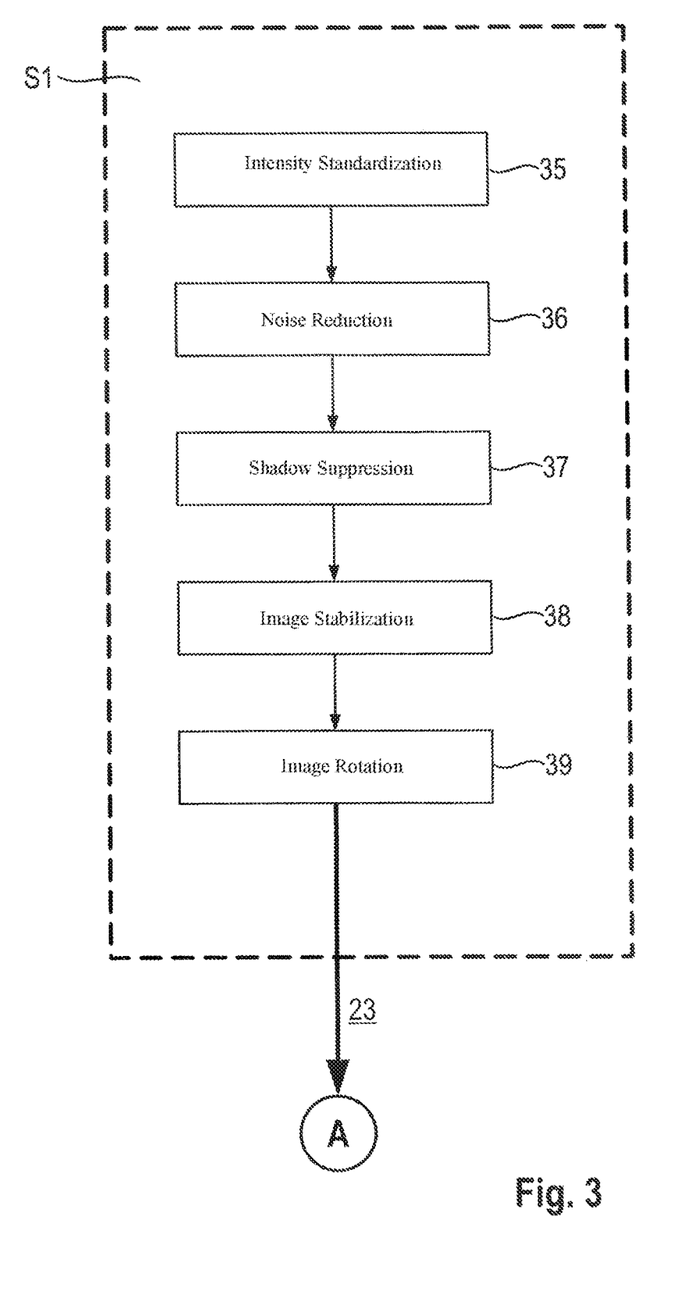
FIG. 3 illustrates a schematic representation of the pre-processing as first step of the image processing system.

FIG. 3 shows a schematic representation of the preprocessing as first step S1 of the image processing system 20. The preprocessing of the images 23 in the first step S1 may comprise any one, any combination, or all of the following: intensity standardization 35; noise reduction 36; shadow suppression 37; image stabilization 38; or image rotation 39. In this regard, the preprocessing of the images in the first step S1 may comprise intensity standardization 35. Alternatively or in addition, the preprocessing of the images 23 in the first step S1 may comprise noise reduction 36. In addition, the preprocessing of the images 23 in the first step S1 may comprise shadow suppression 37. Further, the preprocessing of the images 23 in the first step S1 comprises image stabilization 38. In addition, the preprocessing of the images 23 in the first step S1 comprises image rotation 39. In this regard, one or more of the cited preprocessing actions may be performed for preprocessing of the images 23. Thus, the preprocessing may be performed in the sequence shown in FIG. 3. However, a different sequence is also contemplated.

The intensity standardization 35 may be performed by means of histogram equalization. In one implementation, in the process, a uniform distribution is essentially calculated from an intensity distribution in a histogram, so that to the greatest possible extent an entire available intensity range is exploited. Regions of the histogram with frequent intensities are in the process broadened, while regions of the histogram with less frequent intensities are compressed. As an alternative, it is contemplated to use other methods of intensity standardization 35, such as other homogeneous standard transformations (e.g., other histogram-based methods). The noise reduction 36 may be performed by means of a median filter. In one implementation, in the process, the intensities of the pixels in a defined surrounding area of a pixel are recorded, sorted by size and placed in hierarchy. Then, the intensity value in the middle of the hierarchy is selected and replaces the intensity value of the current pixel. As a result, in particular the small bright points may be removed from the images 23. As an alternative, it is also contemplated to use other non-linear filters, such as other hierarchical filters, for noise reduction 36. In addition, the shadow suppression may be performed by means of a difference filter. In one implementation, in the process, an auxiliary image from the respective image 23 is calculated, wherein the intensities of the pixels of the auxiliary image are in each case an average of the intensities of the pixels of the respective image 23 surrounding the respective pixel. The intensities of the auxiliary image may be subsequently subtracted from the image 23 in each case, so that in the resulting image 23, the intensity of each pixel is the deviation of the average from the surrounding pixels of the original image 23. In the process, negative intensity values are set to 0 and the total intensity values are optionally multiplied by a correction factor. In addition, the image stabilization 38 may be performed such that a reference range in the image 23 is selected, which is in all images 23, for example the inclined conveyor 5, the reel 7 or other components of the agricultural work machine 1. Subsequently, a vertical and horizontal position of the reference range may be fixed in the image 23 and the image 23 is aligned to it, by calculating the optical flow 25 and corresponding vector fields 26 for the reference range of each image 23, and each image 23 is positionally corrected with the help of the respective corresponding vector field 26 of the reference range. In this way, vibrations and oscillations of the driver's cab 15 and thus also of the sensor system 17 may be equalized in the image 23 and the detection range 21 may essentially be kept constant. The same method may be used for determining the optical flow 25 as in further step S2. In the image rotation 39, each image 23 may be aligned with the help of edges of the crop gathering machine 3 and/or of the agricultural work machine 1. The edges may be aligned such that they run parallel or orthogonally to the direction of travel FR and/or to the crop flow 22. To this end, edge detection may occur, such as by means of a Hough transformation. The preprocessing images 23 are then used for calculation of the optical flow 25 and of the corresponding vector fields 26 in the further step S2.

In further step S2, position shifts of the intensity patterns 46 between the images 43, 44 of at least one image pair 45 may be used for determining the optical flow 25. Hence, preferably individual pixels of the intensity patterns 46 each have a specific position shift assigned. The position shifts may comprise shift values and shift directions. Each shift can be represented as a vector 47. The shift values reflect the width of a shift. The shift directions reflect a direction of the shift. The shift amounts 48 and/or shift directions 49 of the intensity patterns 46 for each image pair 45 may be combined as vectors 47 in each case in the corresponding vector field 26, such as of a matrix, of the respective image pair 45. Hence, in each case, for every image pair 45, a corresponding vector field 26 may be calculated. The vector field is hence a bundling of the vectors 47 of an image pair 45 to a mathematical term. The vectors 47 may be calculated over a wide area for the intensity patterns 46 of an image pair 45.

Under the assumption that the interval between the images 43, 44 of an image pair 45 is small enough, it can be roughly assumed that the intensity patterns 46 can shift from the first to the second image 43, 44 of an image pair 45, but the intensity levels remain constant. As a result, by allocating the intensity patterns 46 of an image pair 31 to one another, shifts in the image 23 can be determined.

Each shift may be two-dimensional or three-dimensional depending on the generated image 23. Thus, in one implementation, the shift is two-dimensional. As an alternative, the optical flow can also be calculated by recorded image features and objects. However, as a rule this necessitates prior image segmentation for edge detection.

In the further step S2, the optical flow 25 and the corresponding vector fields 26 may be calculated with a differential method. In the process, in the case of the differential method, a gradient function is generated in each case by derivation of the intensity patterns 46 of every image 23. The intensities may be partially derived chronologically or spatially. In addition, the gradient functions of both images 23 of the respective image pair 45 may be subtracted. The resulting function then may reflect the shift of the intensity patterns 46 for the corresponding vector field 26 of the image pair 45. As an alternative, it is contemplated to determine the optical flow 25 by means of phase correlation, block-based or discrete optimization methods.

In the further step S2, the differential method may comprise a Lucas-Kanade method. In the case of this method, it is further assumed that a uniformity of the optical flow 25 exists in a local surrounding area of a pixel of an image 23, for which the optical flow 25 is determined. In addition, the shifts may be preferably small. To this end, the frame rates may be high, in order to make possible slight intervals between the images 43, 44 of an image pair 45. The local surrounding area of a pixel can comprise pixels adjacent to the pixel and/or surrounding pixels spaced from the pixel. Along with the vector field 26, by means of the Lucas-Kanade method, in addition a transformation matrix may be calculated which records rotation movements of the intensity patterns 46, preferably of parts of the intensity patterns 46. As an alternative, it is contemplated to calculate the optical flow 25 for example with a Horn-Schunck method. In addition, it is contemplated to calculate the optical flow 25 with methods derived from the Lucas-Kanade method and/or the Horn-Schunck method.

Figure 4:
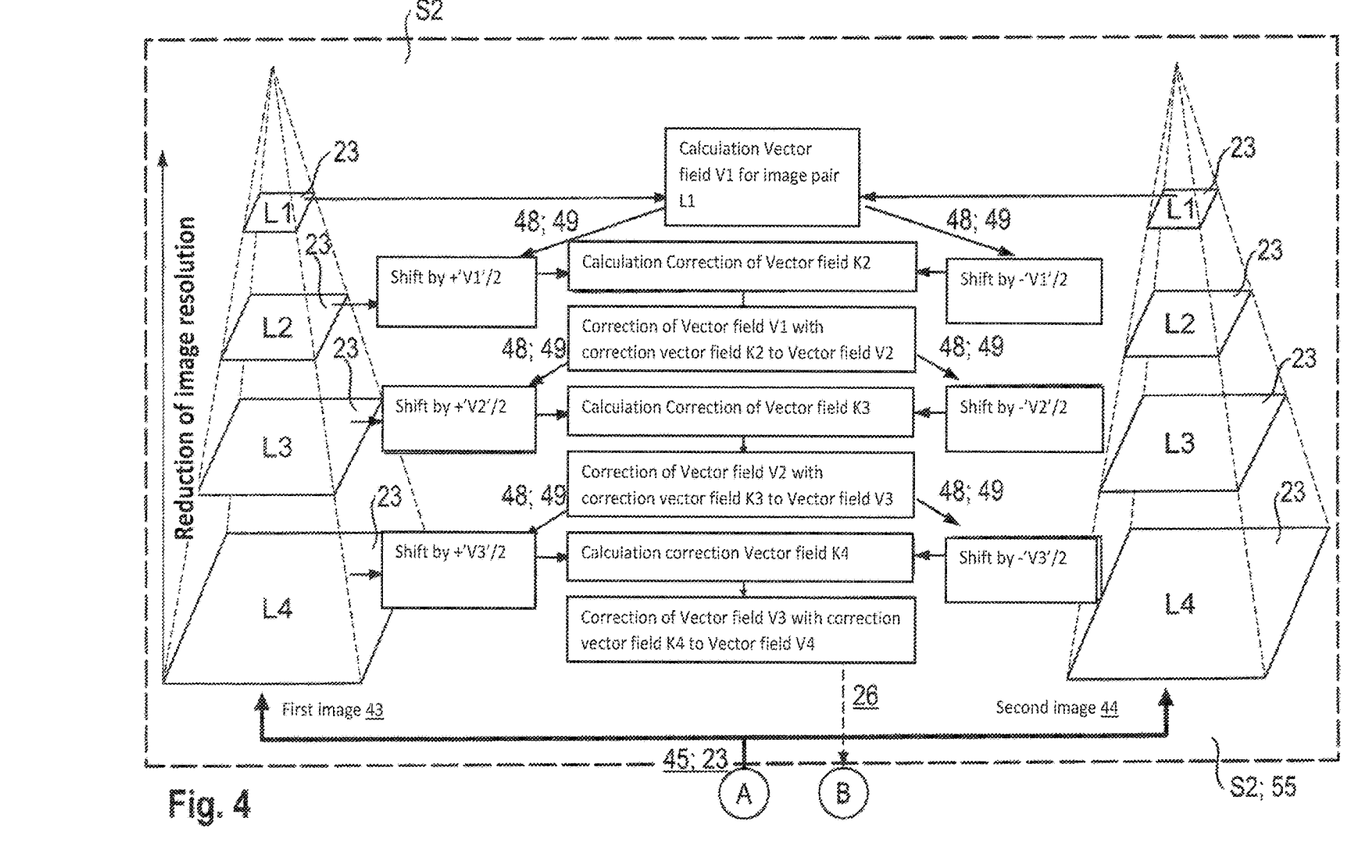
FIG. 4 illustrates a schematic representation of a determination of an optical flow and of corresponding vector fields by means of the pyramidal Lucas-Kanade method as a further step of the image processing system.

FIG. 4 shows a schematic representation of the determination of the optical flow 25 and of corresponding vector fields 26 as a further step S2 of the image processing system 20. The calculation may occur by means of a pyramidal Lucas-Kanade method 55, which is derived from the Lucas-Kanade method. For calculation of the optical flow 25 and of corresponding vector fields 26, a first, such as original image resolution of the images 43, 44 of every image pair 45, is reduced to at least one further image resolution, such as to several image resolutions. In the present example, both images 43, 44 of the respective image pair 45 are present in four image resolutions and are allocated, in particular depending on this image resolution, to an equal number of resolution levels L1-L4. The image resolutions may increase with each resolution level L1-L4. The first resolution level L1 comprises the images 23 with one of the further image resolutions, in particular with the lowest image resolution. The second image resolution level L2 comprises the images 23 with another one of the further image resolutions, in particular with the second-lowest image resolution. The third image resolution level L3 comprises the images 23 with another one of the further image resolutions, in particular with the third-lowest image resolution. The fourth image resolution level L4 comprises the images 23 with the first image resolution, that is, its highest, original image resolution. Other numbers of levels are contemplated.

Subsequently, the optical flow 25 and the corresponding vector fields 26 are calculated and iteratively corrected in an incremental restoration of the first image resolution. In the process, the optical flow 25 and a first vector field V1 for the image pair 45 may first be calculated with the lowest image resolution from the resolution level L1. The Lucas-Kanade method may be used for this purpose. Subsequently, the shift values 48 and shift directions 49 of the first vector field V1 are used to shift the intensity patterns 46 of the first image 43 of the image pair 45 of the second resolution level L2 by half shift values 48 of the first vector field V1 to the shift directions 49 of the vector field V1, and the intensity patterns 46 of the second image 44 of the respective image pair 45 of the second resolution level L2 by the half shift values 48 of the first vector field V1 against the shift directions 49 of the vector field V1. Subsequently, a correction vector field K2 of the second resolution level L2 is calculated from both shifted intensity patterns 46. Hence, each correction vector field K2-K4 may return a resolution-related error in the vector field of the previous resolution level L1-L3. Next, the first vector field V1 is corrected with the correction vector field K2 of the second resolution level L2 and the second vector field V2 arises from the first vector field V1. The second vector field V2 now has more precisely calculated shift values 48 and shift directions 49. These are now used to shift the intensity patterns 46 of the images 43, 44 of the respective image pair 45 of the third resolution level L3, similar to before. Subsequently, a correction vector field K3 of the third resolution level L3 is calculated from both shifted intensity patterns 46. After that, the second vector field V2 is corrected with the correction vector field K3 of the third resolution level L3 and third vector field V3 arises from the second vector field V2. Once again, the third vector field V3 has more precise shift values 48 and shift directions 49. These are used similar to before to shift the intensity patterns 46 of the images 43, 44 of the fourth resolution level L4 and to calculate a correction vector field K4 of the fourth resolution level L4 from the intensity patterns 46 of the images 23 of the fourth resolution level L4. After that, the third vector field V3 is corrected with the fourth correction vector field K4 of the fourth resolution level L4 and the fourth vector field V4 arises from the third vector field V3. The fourth vector field V4 may have the most precise shift values 48 and shift directions 49. It is used as the corresponding vector field 26 in the following step S3.

The individual vector fields V1-V4 and correction vector fields K1-K4 of the associated resolution levels L1-L4 of the pyramidal Lucas-Kanade method 55 may each be calculated with the Lucas-Kanade method, which is based on the differential method.

A number of resolution levels L1-L4 may depend on the first, that is, the original image resolution of the images 23 and/or a required precision of the determined values. With a high image resolution of the images 23, the image resolution can be reduced more sharply and the number of resolution levels L1-L4 can be increased.

Figure 5:
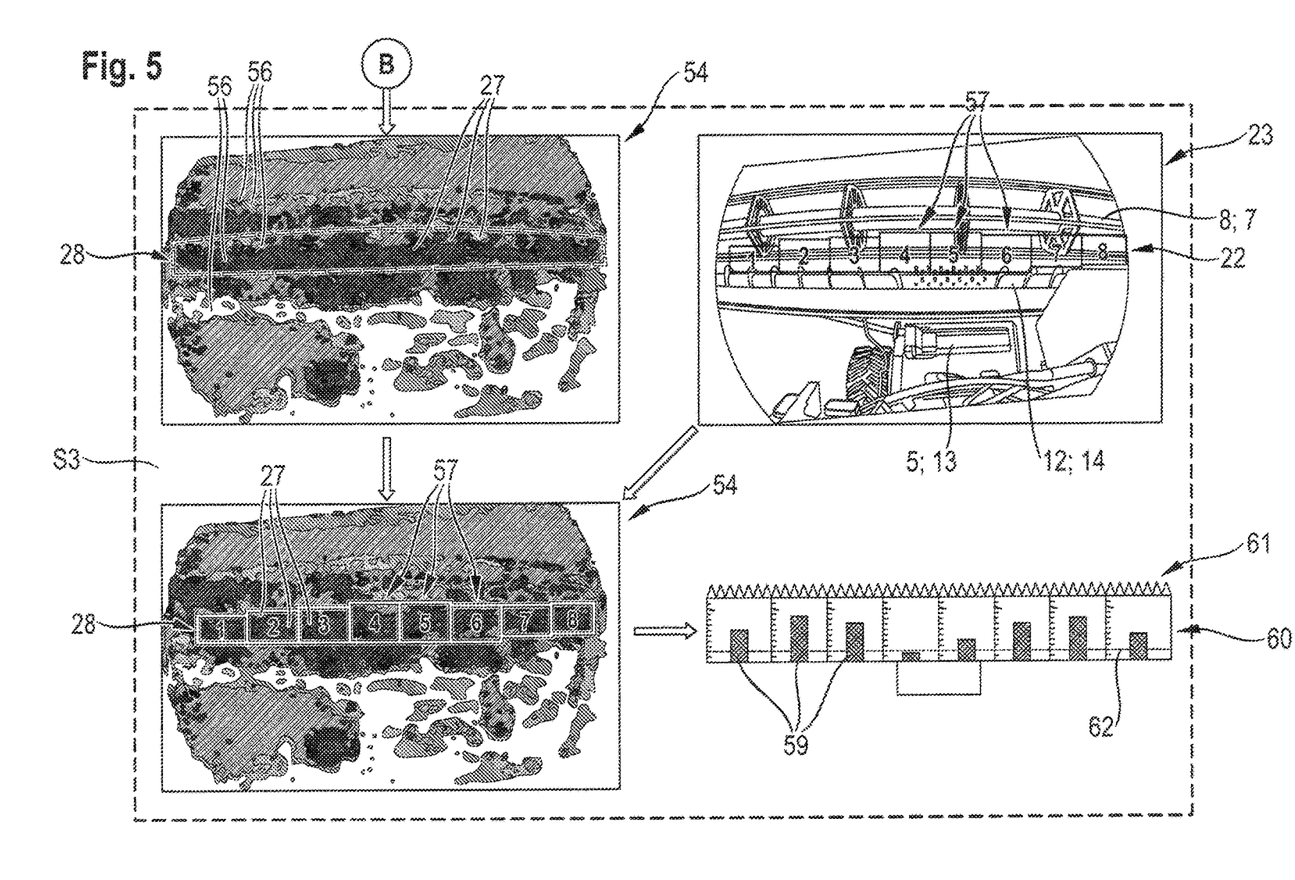
FIG. 5 illustrates a schematic representation, as part of an image processing system, of: determined speeds of a speed trend; a division of the crop flow in regions; and a discrete crop flow speed trend.

FIG. 5 shows a schematic representation of determined speeds 56 from an image pair 45 as a speed trend 54 and a division of the crop flow 22 into regions 57 as part of a following step S3 of the image processing system 20. In the following step S3, speeds 56 in the images 23, such as the crop speeds 27 of the crop flow 22 in the crop gathering machine 3, may be calculated from the shift values 48 of the corresponding vector field 26 of the respective image pair 45 and the time between the images 43, 44 of the respective image pair 45. The speeds 56 may be represented as speed trends 54. In addition, the crop flow speeds 27 may be represented as crop speed trends 28. The representation of the crop flow speed trends 28 may occur in real time. For representation, an entire speed range may be assigned to a color scale, so that each speed 56 is represented with a specific color. A speed 56 may be assigned to each pixel and/or partial image.

In addition, the shift directions 49 of the vector field 26 of the respective image pair 45 may be used to detect machine parts, for example rotating reels 7 and to suppress them from the speed trend 54 and exclude them from further calculations. To this end, each direction may be assigned a color value, such as from a 360° color space. The shift directions 49 of each vector field 26 can then be represented in a direction trend as color values similar to the speed trend 54 (not shown).

In addition, in the following step S3, image ranges that represent the crop flow 22 may be divided into regions 57. The regions 57 may be adjacent to one another. In the present example, the crop flow 22 is divided into eight regions 57. The regions 57 may be transferred to the crop flow speed trends 28.

In addition, an averaged crop flow speed 59 may be determined for each region 57 by forming averages from the crop flow speeds 27 of the respective region 57. To this end, in each case, a median may be determined from the crop flow speeds 27 of the respective region 57. To this end, a chronological crop flow speed trend 28 of each averaged crop flow speed 59 of the respective region 57 may be smoothed by means of a filter, such as a low pass filter. The averaging may occurs alternatively by calculating an average. Alternatively or in addition, the averaging occurs by calculating a geometrical, harmonic, quadratic and/or cubic average, and/or weighted averages.

The number of regions 57 may depend on the dimensions of the crop flow 22, and hence indirectly on the dimensions of the crop gathering machine 3, and/or on a necessary local resolution of the averaged crop flow speeds 27. The regions 57 may be determined upon manufacture (such as at the factory). In addition, different crop gathering machines 3 may be automatically detected and/or can be manually selected from a list. In the process, the image processing system 20 may adapt number, size and/position of the regions 57. To this end, the image processing system may accesses a database with the required information. Alternatively or in addition, the vehicle driver may manually change the regions 57.

Figure 6A:
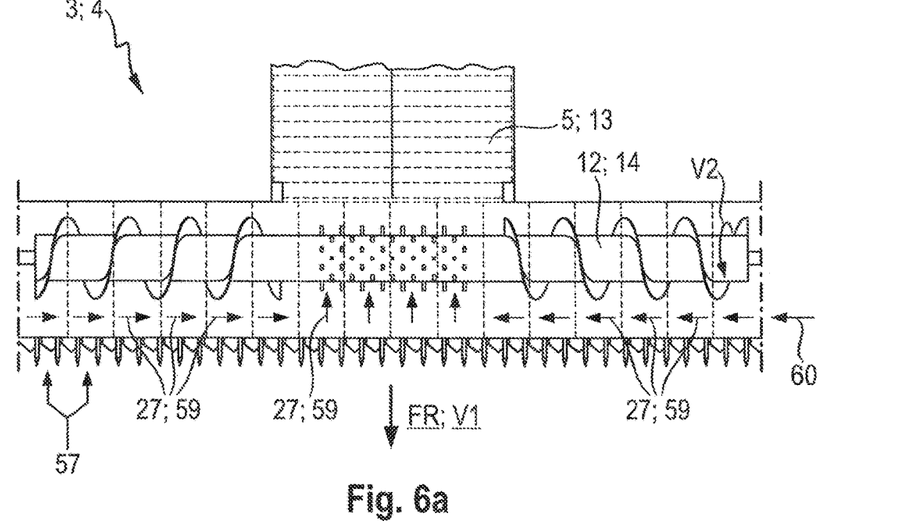
FIG. 6a-b illustrates a schematic representation of the crop gathering machine, including FIG. 6a illustrating a view from above with determined mean crop flow speeds and FIG. 6b illustrating a lateral view with the control system of the crop gathering machine.
Figure 6B:
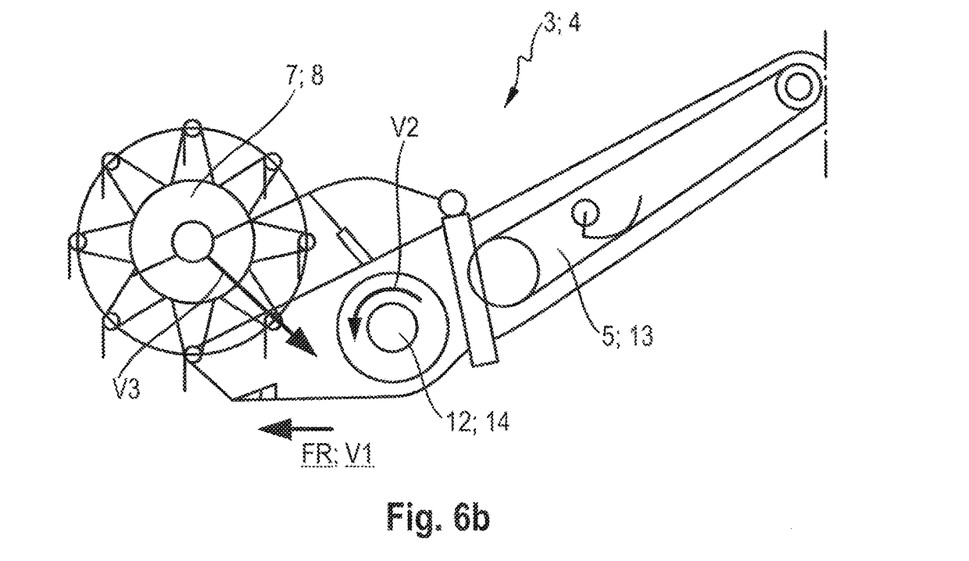

In the following step S3, discrete crop flow speed trends 60 may be derived and assessed from the averaged crop flow speeds 59 of every region 57. In the case of the discrete crop flow speed trends 60, every region may be assigned an averaged crop flow speed 59. The discrete crop flow speed trends 60 may be visually displayed to the vehicle driver. In addition, the averaged crop flow speeds 59 may be represented as bars in a schematic representation 61 of the crop gathering machine 3. The schematic representation 61 may also have limits 62, which indicate a crop jam and/or a formation of a crop jam. The limits 62 may be predefined for an identification of the formation of a crop jam and/or of the crop jam and/or are specified by the vehicle driver. The predefined limits 62 may be set by the manufacturer. In addition, the limits 62 may be grain-type specific and/or moisture specific. The logic and control unit 29 may also be configured to generate warning signals for a vehicle driver upon identification of the formation of a crop jam or crop jam. The warning signals may be visual and/or acoustic. A color of the bar may depend on the averaged crop flow speeds 59. The discrete crop flow speed trends 60 may be sent by means of the data output unit 24 from the image processing system 20 to a display unit (not shown in the figure) in the driver's cab 15 and displayed there. In addition, the discrete crop flow speed trends 60 may be sent by means of the data output unit 24 from the image processing system 20 to the logic and control unit 29.

The logic and control unit 29 may be configured to identify a decrease in the crop flow speeds 27 in certain areas and/or of the averaged crop flow speeds 59 and to interpret this as formation of a crop jam. As an alternative, instead of this, the image processing system 20 may be configured to perform this functionality. In addition, the logic and control unit 29 may be configured to carry out regulatory measures to resolve the resulting crop jam. The resulting crop jam may have a significant reduction of the crop flow speeds 27 in the crop flow 22.

The regulatory measures may comprise a reduction in the vehicle speed V1. Alternatively or in addition, the regulatory measures may comprise a reduction in the crop conveying speed V2 of the crop conveyor device 14. The crop conveying speed V2 may be a speed of rotation of the transverse conveyor 12. Alternatively or in addition, the regulatory measures may comprise a shifting V3 of the reel 7. In the process, the reel 7 is adjusted in its height and/or to the front or the rear such that parts of it engage in regions of the crop flow 22 with the identified formation of a crop jam. In particular, the parts of the reel 7 comprise the reel tines.

The logic and control unit 29 may be configured to identify stoppage of the crop flow 22 in certain areas and to interpret it as a crop jam. Alternatively or in addition, the logic and control unit 29 may be configured to carry out further regulatory measures to resolve the crop jam. The further regulatory measures may comprise a stopping or a resetting of the agricultural work machine 1. Alternatively or in addition, the further regulatory measures may comprise a lifting of the crop gathering machine 3. In this regard, the logic and control unit 29 may be configured to cause the lifting of the crop gathering machine 3, such as by sending a command in order to instruct the crop gathering machine 3 to lift. In the case of lifting of the crop gathering machine 3, in particular an inclination of the crop gathering machine 3 is changed. The crop jam is preferably in certain areas stoppage of the crop flow 22. The crop flow may be present at in certain areas crop flow speeds 27 and/or at least one averaged crop flow speed 59 of zero or close to zero meters/minute. However, it can also be configured as a crop flow 33 with low crop flow speeds 27 in certain areas. The formation of a crop jam on the other hand may be present when crop flow speeds decrease in certain areas and/or at least an averaged crop flow speed, in particular a significant one, decreases.

The logic and control unit 29 may send control signals to the actuators assigned to it for controlling the reel 7, the crop conveyor device 14 and/or the vehicle speed V1. The actuators can comprise valves, drives, hydro motors, hydro pumps and/or further actuators.

In addition, in the case of essentially high averaged crop flow speeds 59, in particular in the case of maximum averaged crop flow speeds 59, the vehicle speed V1 may be increased. As a result, a suboptimal crop flow 22 of the crop gathering machine 3 can be prevented.

LIST OF REFERENCES

1 Agricultural Work Machine
2 Combine Harvester
3 Crop Gathering Machine
4 Cutting Unit Attachment
5 Inclined Conveyor
6 Cutting Unit Housing
7 Reel
8 Crop Collecting Device
9 Crop
10 Crop Cutting Device
11 Harvested Goods
12 Transverse Conveyor
13 Crop Feeding Device
14 Crop Conveyor Device
15 Driver's Cab
16 Camera
17 Sensor System
19 Surrounding area/Surroundings
20 Image Processing System
21 Detection Range
22 Crop Flow
23 Images
24 Data Output Unit
25 Optical Flow
26 Corresponding Vector Field
27 Crop Flow Speed
28 Crop Flow Speed Trend
29 Logic and Control Unit
30 Image Sequence
35 Intensity Standardization
36 Noise Reduction
37 Shadow Suppression
38 Image Stabilization
39 Image Rotation
43 First Image of an Image Pair
44 Second Image of an Image Pair
45 Image Pair
46 Intensity Pattern
47 Vector
48 Shift Values
49 Shift Direction
54 Speed Trend
55 Pyramidal Lucas-Kanade Method
56 Speed
57 Regions
59 Averaged Crop Flow Speed
60 Discrete Crop Flow Speed Trends
61 Schematic Representation of the Crop Gathering Machine
62 Limit
V1 Vehicle Speed
V2 Crop Conveying Speed
V3 Shifting of the Reels
K2 Correction Vector Field of the Second Resolution Level
K3 Correction Vector Field of the Third Resolution Level
K4 Correction Vector Field of the Fourth Resolution Level
L1 First Resolution Level
L2 Second Resolution Level
L3 Third Resolution Level
L4 Fourth Resolution Level
S1 First Step of the Image Processing System
S2 Second Step of the Image Processing System
S3 Third Step of the Image Processing System
FR Direction of Travel

The invention claimed is:

1. An agricultural work machine comprising:
a crop gathering machine comprising at least one of a crop cutting device, a crop collecting device or a crop feeding device, and at least one crop conveyor;
an image processing system;
a data output unit; and
at least one sensor system assigned to the crop gathering machine for generating images in order to record a crop flow in the crop gathering machine,
wherein the sensor system is in communication with the image processing system in order to transfer the images,
wherein the image processing system is configured to process a selection of the images by:
(1) pre-processing the images,
(2) determining an optical flow and corresponding vector fields from the pre-processed images, and
(3) deriving and assessing speed trends of the crop flow from the corresponding vector fields.

2. The agricultural work machine according to claim 1, wherein the at least one sensor system comprises a camera.

3. The agricultural work machine according to claim 2, wherein the camera is configured as a monochrome or a color camera.

4. The agricultural work machine according to claim 1, wherein the sensor system is configured to generate the images of the crop gathering machine and an adjacent surrounding area; and
wherein the adjacent surrounding area comprises a field region in a direction of travel of the agricultural work machine in front of the crop gathering machine or behind the crop gathering machine.

5. The agricultural work machine according to claim 1, wherein the image processing system comprises an electronic computing unit configured to electronically process and evaluate the images or evaluate image data derived from the images.

6. The agricultural work machine according to claim 1, wherein the image processing system is configured to group two images into an image pair, records or specifies a time between the two images of the image pair; and
wherein each image in the image pair has an intensity pattern.

7. The agricultural work machine according to claim 1, wherein the image pair comprises two consecutive images of an image sequence.

8. The agricultural work machine according to claim 1, wherein the image processing system is configured to pre-process the images by performing at least one of: intensity standardization, noise reduction, shadow suppression, image stabilization or image rotation.

9. The agricultural work machine according to claim 1, wherein the image processing system is configured to pre-process the images by performing: intensity standardization, noise reduction, shadow suppression, image stabilization or image rotation.

10. The agricultural work machine according to claim 1, wherein the image processing system is configured to determine the optical flow by determining position shifts of intensity patterns between the images of at least one image pair.

11. The agricultural work machine according to claim 10, wherein the position shifts comprise shift values and shift directions; and
wherein at least one of the shift values or the shift directions of the intensity patterns for each image pair are respectively combined as vectors in a corresponding vector field of the respective image pair.

12. The agricultural work machine according to claim 11, wherein the vector field comprises a matrix.

13. The agricultural work machine according to claim 11, wherein the optical flow and the corresponding vector fields are calculated by a differential method.

14. The agricultural work machine according to claim 13, wherein the differential method generates a gradient function by deriving the intensity patterns of each image, subtracting the gradient functions of both images of the respective image pair and a resulting function reproduces the shifts of the intensity patterns for the corresponding vector field of the image pair.

15. The agricultural work machine according to claim 14, wherein the differential method comprises a Lucas-Kanade method in which a consistency of the optical flow is assumed in a local surrounding area of a pixel of the image for which the optical flow is being determined.

16. The agricultural work machine according to claim 15, wherein the Lucas-Kanade method comprises a pyramidal Lucas-Kanade method, in which a first image resolution of the images of each image pair is reduced to at least one further image resolution for calculation of the optical flow and the corresponding vector fields and subsequently the optical flow and the corresponding vector fields are calculated and iteratively corrected in an incremental restoration of the first image resolution.

17. The agricultural work machine according to claim 1, wherein the image processing system is configured to determine:
crop flow speeds of the crop flow in the crop gathering machine from shift values of a corresponding vector field of a respective image pair,
time between the images of the respective image pair, and
crop flow speed trends of the crop flow.

18. The agricultural work machine according to claim 17, wherein the image processing system is configured to:
divide regions that represent the crop flow into regions;
determine an averaged crop flow speed for each region; and
derive and assess discrete crop flow speed trends from the averaged crop flow speeds of each region.

19. The agricultural work machine according to claim 18, wherein the image processing system is configured to determine the averaged crop flow speed for each region by forming a median from the crop flow speeds of a respective region.

20. The agricultural work machine according to claim 1, wherein the image processing system is configured to:
identify a decrease in one or more areas of at least one of crop flow speeds or averaged crop flow speeds; and
responsive to identifying the decrease, interpret as a formation of a crop jam, and
further comprising a control unit configured to apply one or more regulatory measures in order to resolve the crop jam.

21. The agricultural work machine according to claim 20, wherein the crop collecting device comprises a reel; and
wherein the regulatory measures comprise at least one of:
a reduction of speed of the agricultural work machine;
a reduction of a crop conveying speed of the crop conveyor; or a shifting of the reel so that tines of the reel engage in regions of the crop flow with an identified formation of the crop jam.

22. The agricultural work machine according to claim 20, wherein the image processing system is configured to identify a stoppage of the crop flow in certain areas as a crop jam; and
wherein the control unit is configured to resolve the crop jam by at least one of: stopping or resetting of the agricultural work machine, or causing lifting the crop gathering machine.

* * * * *